March 31, 1970     F. J. MARLOWE     3,503,672
REDUCTION OF TURN-ON DELAY IN LIQUID CRYSTAL CELL
Filed Sept. 14, 1967     3 Sheets-Sheet 1
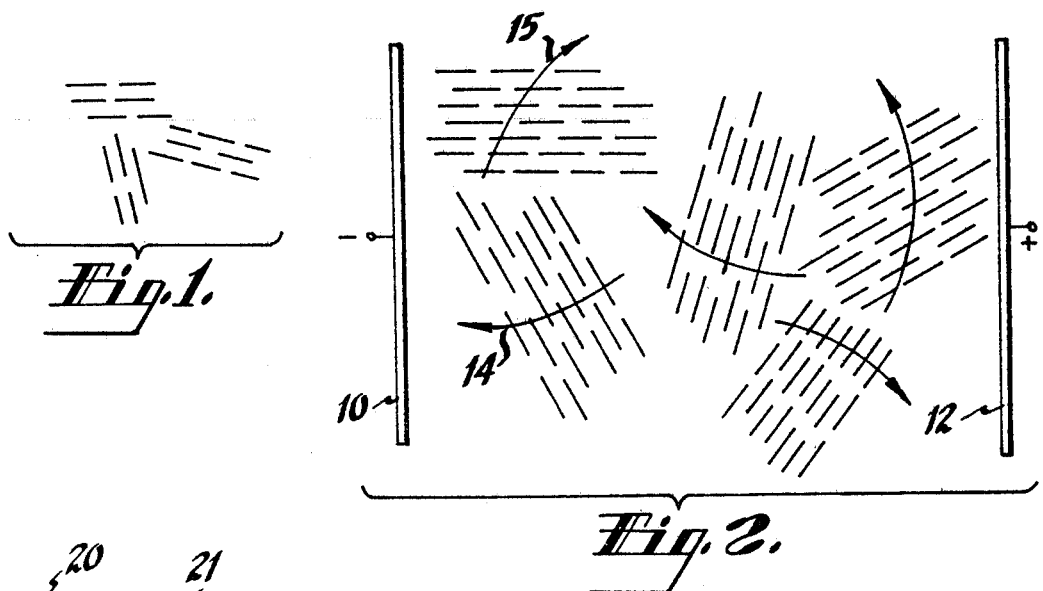
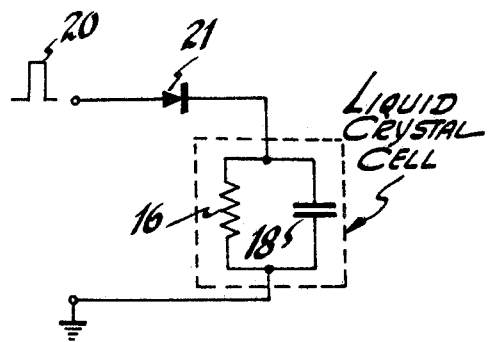
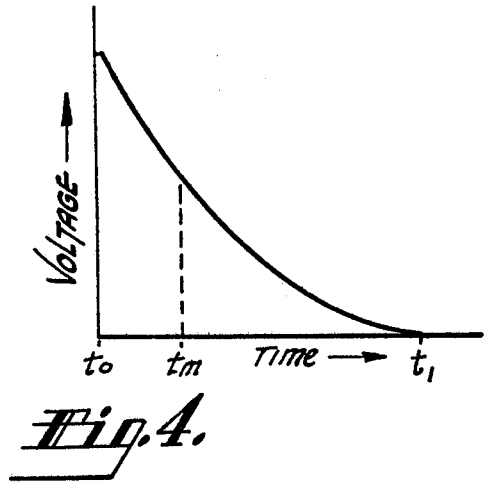
INVENTOR
Frank J. Marlowe
BY
ATTORNEY March 31, 1970    F. J. MARLOWE    3,503,672
REDUCTION OF TURN-ON DELAY IN LIQUID CRYSTAL CELL
Filed Sept. 14, 1967    3 Sheets-Sheet 2

INVENTOR
Frank J. Marlowe
BY
ATTORNEY

INVENTOR
Frank J. Marlowe
BY [signature]
ATTORNEY

United States Patent Office

3,503,672
Patented Mar. 31, 1970

3,503,672
REDUCTION OF TURN-ON DELAY IN LIQUID CRYSTAL CELL
Frank J. Marlowe, Somerset, N.J., assignor to RCA Corporation, a corporation of Delaware
Filed Sept. 14, 1967, Ser. No. 667,856
Int. Cl. G02f 1/28
U.S. Cl. 350—160                    3 Claims

ABSTRACT OF THE DISCLOSURE

Turn-on response time of liquid crystal cell is decreased by applying pulses thereto at a level lower than the voltage threshold for dynamic scattering of the cell.

BACKGROUND OF THE INVENTION

Nematic liquid crystals are described in copending application "Electric-Optical Device," Ser. No. 627,515, filed Mar. 31, 1967, by George H. Heilmeier and Louis A. Zanoni and assigned to the same asignee as the present application. Such crystals, when in an unexcited state, are relatively transparent to light and, when in an excited state, scatter light. In the crystals described in the application, the light scattering, termed "dynamic scattering," results from turbulence developed in the liquid crystal at the region at which it is excited, as is discussed briefly later.

The dynamic scattering exhibited by liquid crystals may be employed in reflective, absorptive and transmissive type flat panel displays, in light shutters and in other applications. However, it is found, in practice, that in those applications for the nematic liquid crystals where it is necessary to turn them on (to change them from their transparent state to their light scattering state) by the successive application of pulses of relatively short duration, such as video pulses, it may take a number of such pulses to cause the liquid crystal to "light up" at full intensity. This, of course, is a disadvantage and, in television applications, results in "leading edge smear."

The object of this invention is to provide a means for quickly turning on a liquid crystal element, that is, for quickly changing such an element from its transparent to its light scattering condition.

SUMMARY OF THE INVENTION

A nematic liquid crystal element is rapidly turned on according to the invention by applying pulses thereto at a level lower than the voltage threshold for dynamic scattering of the element prior to applying a turn-on excitation pulse to the crystal element.

BRIEF DESCRIPTION OF THE DRAWING

FIGURE 1 is a schematic showing of a nematic liquid crystal in its unexcited state;

FIGURE 2 is a schematic showing of a nematic liquid crystal in its excited state;

FIGURE 3 is a schematic drawing of a known nematic liquid crystal excitation circuit in which the liquid crystal is shown in equivalent circuit form;

FIGURE 4 is a drawing of the voltage which exists across the liquid crystal of the circuit of FIG. 3, after a number of excitation pulses have been applied thereto;

DETAILED DESCRIPTION

Figure 5:
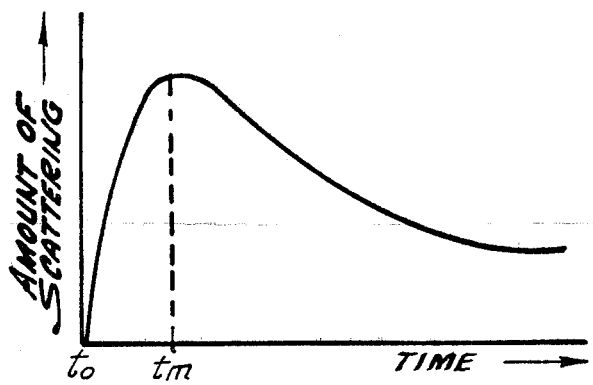
FIGURE 5 is a graph showing the amount of light scattering which occurs in the liquid crystal of the circuit of FIG. 3.

In a nematic liquid crystal of the type discussed in detail in the copending application, liquid crystal molecules are arranged in the manner shown in FIG. 1 in a temperature range of interest in the use of this substance in display applications. As contrasted to ordinary liquids wherein the molecules assume random orientations, small groups of the molecules are in alignment with one another. These groups may be termed domains. The orientation of the domains relative to one another is random and in view of the fact that the number of molecules in each domain is relatively small, the liquid crystal appears to be relatively transparent.

In the use of a nematic liquid crystal in display and other applications, the crystal is located between two conducting elements, shown schematically at 10 and 12 in FIG. 2, and a current is injected into the liquid crystal at a field greater than the dynamic scattering threshold electric field of the crystal. The electric field causes a number of the domains of FIG. 1 to become aligned so that each domain becomes relatively large. The ionic current injected into the liquid crystal causes negative ions to flow from the negatively charged conductor 10 to the positively charged conductor 12. It is believed that during such movement, and possibly during the movement of other ions which may be present in the liquid, the ions collide with or in some other way, disturb the relatively large domains causing them continually to move. This movement is indicated schematically in FIG. 2 by arrows such as 14 and 15. The effect on the eye of such movement is that of scattering light which is incident on the liquid crystal. Contrast ratios due to such scattering of greater than 10 to 1 have been observed. In other words, the brightness of the thin film of liquid crystal in the presence of incident light (this is normally unpolarized light) may be more than 10 times greater during the time the domains are in a turbulent state as shown in FIG. 2 than during the time the liquid crystal is in an unexcited state as shown in FIG. 1.

In practice, a liquid crystal display includes two planar elements with a thin liquid film between them. One of the elements may be transparent and the other reflective. Row and column conductors, which may be transparent conductors, may be in contact with the liquid crystal for exciting selected areas of the liquid crystal. All of this is discussed and shown in the copending application.

A simplified equivalent circuit for a liquid crystal cell is a resistor such as shown at 16, in shunt with a capacitor, such as shown at 18. The crystal is excited by applying a short duration pulse such as 20 to the cell. In television applications, this pulse may have a duration of 0.06 millisecond which is the equivalent of one television line time. This implies that all of the elements of one television line are "addressed" at the same time. Operation in this way, that is, a line at a time rather than an element of a line at a time, is preferred because it permits a greater length of time for capacitor 18 of the liquid crystal cell to charge. It is also important that the capacitor 18 retain its charge for a reasonable time interval to permit the dynamic scattering to take place. The function of diode 21 is to permit such storage. It prevents discharge of the capacitor through the source (not shown) which produces pulse 20 so that the capacitor must discharge through the liquid crystal itself as represented by the resistor 16.

The actual voltage present across the liquid crystal cell after a number of such excitation pulses, is as shown in FIG. 4. At time $t_0$, the pulse 20 is applied. This charges the capacitor and the latter subsequently discharges exponentially, in the manner shown, until at time $t_1$ the capacitor has completely discharged.

The amount of light scattering which occurs in the liquid crystal cell of FIG. 3 is as shown in FIG. 5. It takes a short interval of time $t_0$ to $t_m$, approximately 1–10 milliseconds (depending upon the temperature, field strength and particular material used) for the maximum amount of light scattering to be achieved. At time $t_1$, when there is no longer any voltage across the liquid crystal cell, there is still a considerable amount of scattering present, as the mechanical time constant, that is, the time it takes for the domains of FIG. 2 to relax from their excited condition to their unexcited condition shown in FIG. 1, is relatively long.

Figure 6:
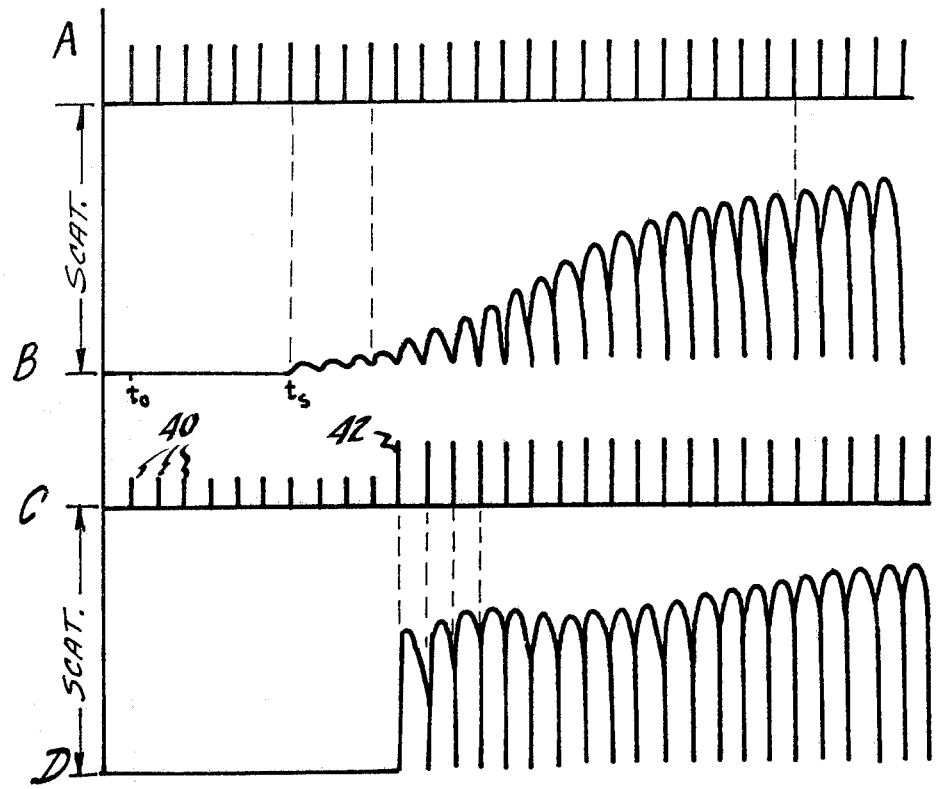
FIGURE 6 is a drawing of waveforms which shows in greater detail the light scattering which occurs in the circuit of FIG. 3 and also in the improved circuit of the present application.

In the actual operation of the circuit of FIG. 3, it is found that if the liquid crystal cell is dark initially (is in its unexcited state), it requires a relatively large number of excitation pulses 20 to be applied before the crystal exhibits the light scattering characteristic shown in FIG. 5. This is shown in the top two waveforms A and B of FIG. 6. The excitation or "write" pulses in FIG. 6, are shown on the upper line A. While these pulses are shown to be of fixed amplitude greater than the dynamic scattering threshold of the crystal, in television applications they would be video pulses and their amplitudes above the dynamic scattering voltage threshold level would correspond to the video information it is desired to write into a particular element successive excitations of that element. These write pulses are each of a duration of approximately 0.06 milliseconds and are at a repetition frequency of approximately 30 pulses per second.

It may be observed in the second waveform B of FIG. 2 that approximately 7 write pulses are required to start the dynamic scattering effect. (While this corresponds to one sample tested, the actual number may be more than or even possibly less than 7, depending upon temperature, cell thickness, cell material and other parameters. For example, in another sample, 15 pulses were required before the crystals began to exhibit any scattering.) The scattering effect does not reach full amplitude until more than 20 write pulses have been applied. (Again, this figure will vary depending upon the conditions discussed above.) It may also be observed that while the wave B is shown to return to the zero scattering axis, the waveform may actually be displaced from the zero scattering axis and this would indicate that there was insufficient time between successive write pulses for the amount of light scattering to reduce to zero. The reason for such displacement, when present, is that mentioned briefly above, namely that the relaxation time constant associated with the turbulence created in the liquid crystal is relatively long. A solution to this problem is given in concurrently filed application, "Turn-Off Method and Circuit for Liquid Crystal Display Element," Ser. No. 667,857, filed Sept. 1, 1967, by George H. Heilmeier and assigned to the assignee of the present application. The circuit of this copending application may be added to the present circuit; however, as it plays no part in our present invention, it is not shown or discussed further herein.

The present inventor has discovered that the discharge time constant for a liquid crystal element does not remain constant but increases with the application of successive pulses. It is believed that it is for this reason that the element initially exhibits a long turn-on delay. Initially, that is, in response to the first excitation pulses, the time constant is relatively low and the capacitor 18 discharges relatively rapidly as illustrated by the solid line curve 30 of FIG. 7. At the time $t_m$, which is the time required for the amount of scattering produced in the crystal to reach its maximum value, the voltage $V_A$ across the cell is extremely low—lower than the dynamic scattering voltage threshold of the cell. Accordingly, no scattering is produced and this is borne out by the region $t_0$–$t_s$ of the curve B of FIG. 6.

The low time constant is believed to be due to a low value of resistance 16 of the cell of FIG. 3. While the reason for this is not completely understood, according to theory developed by others, there are current carriers initially present in the liquid crystal. These may be free ions or impurities or perhaps other conducting particles, the nature of which is not fully understood. The theory states that when the crystal is excited initially, that is, when the pulses are initially applied across the crystal, they cause these current carriers (negative and positive) to travel through the liquid crystal to the positive and negative conductors, respectively, shown at 12 and 10 in FIG. 2. This movement of current carriers through the liquid crystals corresponds to relatively low resistivity of the crystal. (The term relatively low, in the present context, may refer to a resistivity of the order of $10^9$ ohm centimeters compared to a high resistivity condition of the cell of $10^{10}$ ohm centimeters. These numbers are merely examples since cells of other dimensions, cells made of other materials, and cells with other different parameters may have other low and high resistivity values.)

Figure 7:
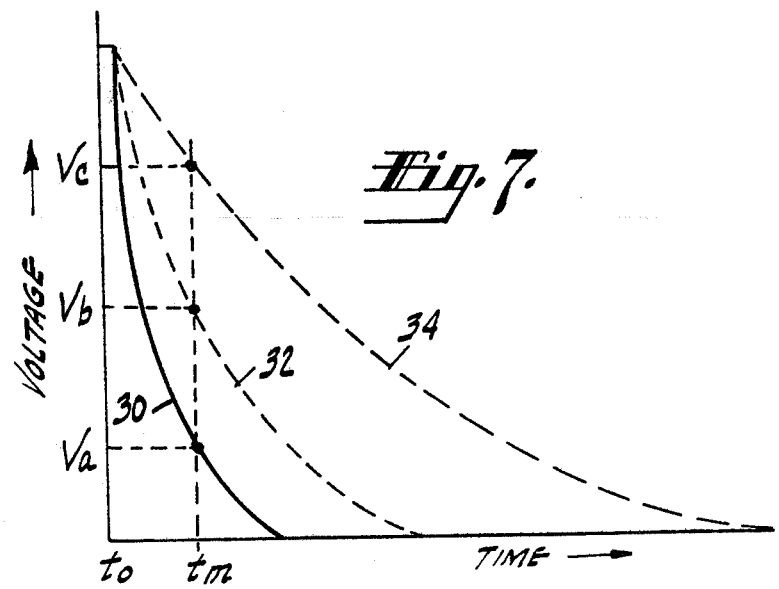
FIGURE 7 is a graph showing the voltage across the liquid crystal cell of FIG. 3 at different periods during the operation of this cell.

According to the theory, as successive pulses continue to be applied to the liquid crystal, the free current carriers gradually are swept out of the liquid and reach the positive and negative conductors (10 and 12 of FIG. 1). During this period, the internal resistance, represented by resistor 16 of FIG. 3, gradually increases. As the value of the resistance increases, the liquid crystal cell discharge time constant increases correspondingly, and the shape of the exponential discharge curve also changes, as shown in FIG. 7. Here, curve 30 may represent the voltage across one particular liquid crystal cell in response to 1 pulse, the curve 32 the voltage in response to perhaps several successive pulses and the curve 34 the voltage in response to perhaps 15 successive pulses. With increasing internal cell resistance, the voltage present across the cell at the time $t_m$ increases. For example, this voltage increases from its initial value $V_A$ through a value $V_B$ to a final value of $V_C$. The dynamic scattering voltage threshold of the circuit is some value between $V_A$ and $V_C$ and, as soon as it is reached, the crystal begins to exhibit the dynamic scattering effect in the manner illustrated in the second waveform B of FIG. 6.

The solution of the present invention to the problem above is illustrated at C and D in FIG. 6. Again, the environment of commercial television and line-at-a-time excitation is assumed. Rather than allowing any element to be free of inputs, each element has continuously applied thereto voltage pulses of an amplitude somewhat lower than the voltage threshold for dynamic scattering of the element. This is illustrated in FIG. 6, row C, by the pulses 40. These pulses are of 0.06 millisecond duration and occur at a rate of approximately 30 pulses per second. If the threshold for dynamic scattering of a cell is 40 volts or so, the pulses 40 of FIG. 6 in row C may have an amplitude of 35 volts or so.

When it is desired to turn a liquid crystal cell "on," the amplitude of the pulses is increased as, for example, is shown at 42. The pulse 42 may, for example, have an amplitude of 100 volts. The result of the application of such a pulse is to turn the cell on "immediately" as illustrated in wave D. Note that in response to this first pulse 42, the amount of scattering produced is quite high, fairly close to the maximum amount of scattering which can be expected. The successive pulses after 42 slightly increase the scattering effect and, after a number of such pulses, the scattering effect reaches its maximum level.

Figure 8:
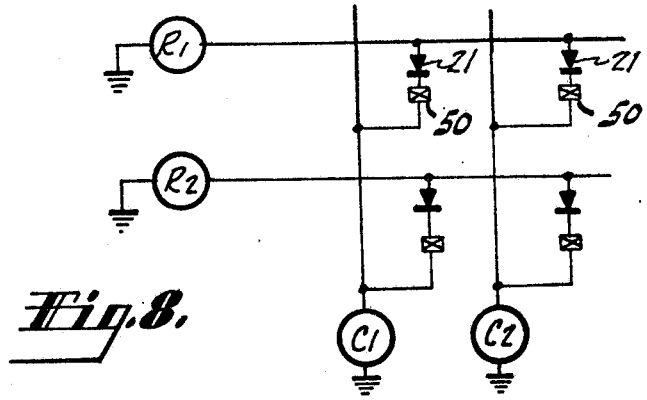
FIGURE 8 is a schematic showing of a matrix of liquid crystal elements according to the present invention.

A matrix of liquid crystal elements arranged according to the invention is shown in FIG. 8. While only two-by-two liquid crystal elements 50 are shown, in practice there are many more elements than this in the matrix. The diodes 21 serve two functions, that of isolation between elements as well as that of permitting each cell to store charge. Every frame interval, that is, approximately every 30 milliseconds, a row of elements is "addressed" by raising the voltage output of a row voltage source such as R1 from −50 volts to +35 volts for 0.06 millisecond for one row interval. Each time a row of elements is addressed, all of the column pulse generators C1, C2 produce outputs of an amplitude representing the brightness of the video information to be written into the respective elements of a row. For example, if the particular cell is to remain "dark," the column generator for that cell produces an output of zero volts while the row generator for that cell produces an output of +35 volts. This voltage causes conduction through a diode and a voltage of 35 volts appears across the liquid crystal cell. The continuous application of such relatively low amplitude pulses to a cell maintains its internal resistance high; however, as the amplitude of the pulses is below the voltage threshold for dynamic scattering of the cell, the cell does not go on (does not produce light scattering).

Figure 9:
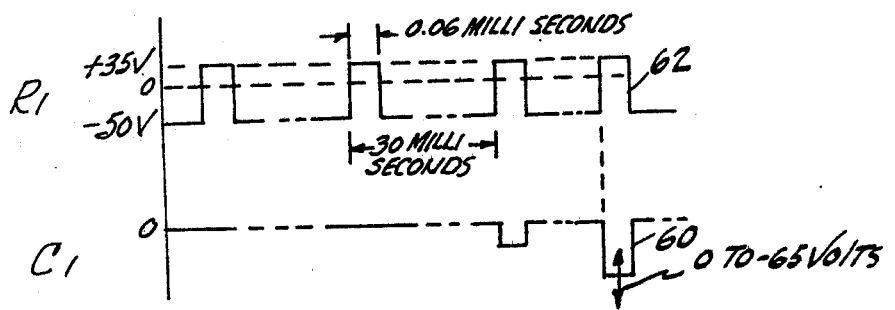
FIGURE 9 is a drawing of waveforms to help explain the operation of the circuit of FIG. 8.

When it is desired that a cell in a row light up, a column voltage pulse generator for that cell produces a negative-going voltage pulse at a level such that the difference between the column and row voltages exceeds the voltage threshold for dynamic scattering of the cell (assumed in the present example to be 40 volts). One such column pulse is illustrated at 60 in FIG. 9. In response to the coincidence of this pulse which, for example, may have an amplitude of +50 volts, and the positive-going pulse 62 produced by a row generator, 85 volts is applied across a liquid crystal cell. This exceeds the voltage threshold for dynamic scattering of the cell and the cell goes on immediately, that is, it produces an amount of scattering which is dependent upon the amplitude of the voltage applied by the generator C1.

What is claimed is:
1. In combination:
   a liquid crystal element of the type which, when in an unexcited state exhibits a relatively low internal resistance and produces no light scattering and when in an excited state exhibits a relatively high internal resistance and produces a substantial amount of light scattering;
   means for maintaining the resistivity of said liquid crystal at a value substantially closer to said relatively high internal resistance value than to said relatively low internal resistance value without causing said liquid crystal element to scatter light, comprising means for continuously applying to said liquid crystal element electrical pulses of an amplitude lower than the threshold voltage for dynamic scattering of said liquid crystal element; and
   means for electrically exciting said liquid crystal element for causing it to scatter light.

2. In the combination set forth in claim 1, the last-named means comprising means for applying electrical pulses to said liquid crystal element of an amplitude such that the threshold voltage for dynamic scattering of said liquid crystal element is exceeded.

3. In combination:
   a liquid crystal element of the type which, when in an unexcited state produces no light scattering and, when in an excited state, produces a substantial amount of light scattering due to turbulence of the liquid crystal;
   means for decreasing the turn-on time of said liquid crystal element comprising means for continuously applying to said liquid crystal element electrical pulses of an amplitude lower than the threshold voltage for dynamic scattering of said liquid crystal element; and
   means for electrically exciting said liquid crystal element for causing it to scatter light.

References Cited

UNITED STATES PATENTS 3,178,657  4/1965  Morse _____ 331—94.5
3,322,485  5/1967  Williams _____ 350—160

RONALD L. WIBERT, Primary Examiner

EDWARD BAUER, Assistant Examiner